United States Patent Office 3,125,530
Patented Mar. 17, 1964

3,125,530
LUBRICATING GREASE COMPOSITIONS
Raymond L. Mayhew, Summit, N.J., and Joseph P. Copes, Easton, Pa., assignors to General Aniline & Film Corporation, New York, N.Y., a corporation of Delaware
No Drawing. Filed Mar. 21, 1961, Ser. No. 97,128
4 Claims. (Cl. 252—51.5)

The present invention relates to improved lubricating grease compositions, and relates more particularly to thickening agents for lubricating grease compositions.

This application is a continuation-in-part of our applications Serial No. 625,234, filed November 30, 1956, and Serial No. 822,999, filed June 26, 1959, both now abandoned.

Lubricating greases are generally made by forming a homogeneous suspension of soap in non-volatile and viscous lubricating oils. In forming the greases, the soaps, generally fatty acid soaps of earth metals, such as, calcium, soda, aluminum, barium, lead, lithium, etc., are usually made in contact with the lubricating oil with agitation at elevated temperatures. When the incorporation of the soap and the viscous oil is finished, the product is cooled at a definite rate and then milled to impart desired viscosity characteristics. When sodium greases are heated and cooled, they tend to set to a very heavy mass which are unstable to shearing forces. The calcium greases on the other hand have low dropping points. Both the calcium and sodium greases have little rust preventive action and the water resistance of the sodium greases is quite low. In contact with water, such greases tend to emulsify and wash away, thus losing their effectiveness as a lubricant.

Therefore, an object of the present invention is to provide a lubricating grease composition having therein a thickening agent with which said lubricating composition is rust inhibiting, water resistant and stable to shearing forces.

Other objects and advantages of the invention will become more clearly apparent from the following description.

The above and other objects of the present invention are accomplished by adding to any petroleum hydrocarbon such as petroleum oils, petrolatum, mineral oils, having a Saybolt viscosity at 100° F. of 50 to 5,000, a thickening amount of at least one N-substituted-γ-hydroxycarboxylic acid amide characterized by the following general formula:

$$\underset{\text{OH}}{\text{R}-\overset{|}{\text{C}}\text{H}-\text{CH}_2\text{CH}_2\text{CONHC}}\overset{\text{R}_1}{\underset{\text{R}_{11}}{\diagup}}$$

wherein R represents either hydrogen or a methyl group, $R_1$ represents an organic radical, devoid of water solubilizing groups such as sulfonic or carboxylic acid groups, containing from 10 to 30 carbon atoms, e.g. decyl, undecyl, undecylenyl, hendecyl, dodecyl, tridecyl, tetradecyl, cetyl, myristolenyl, pentadecyl, heptadecyl, hexadecyl, hexadecenyl, octadecyl, octadecenyl, octadecadienyl, abietinyl, dehydroabietinyl, dihydroabietinyl, oleyl, elaidyl, erucyl, monylbenzyl, octylbenzyl, diamylbenzyl, dioctylbenzyl, etc., and mixtures of such radicals, and $R_{11}$ represents either hydrogen or an alkyl group of from 1 to 18 carbon atoms, e.g. methyl, propyl, butyl, amyl, hexyl, nonyl, decyl, dodecyl, cetyl, octadecyl, etc., the total number of carbon atoms constituting the groups in both $R_1$ and $R_{11}$ being a minimum of 10 and not more than 48 carbon atoms.

The compounds utilized in accordance with the present invention are obtained by the reaction of one mole of an aliphatic N-primary amine or mixtures of such amines containing from 10 to 40 carbon atoms with one mole of either γ-butyrolactone or γ-valerolactone at a temperature of 80–95° C. as disclosed in application Serial No. 625,224, filed November 30, 1956, and now abandoned, the complete disclosure of which is incorporated herein by reference to the various compounds per se which are useful as thixotropic and thickening agents and to the method of preparing the same.

As illustrative examples of the thixotropic and thickening agents characterized by the foregoing formula, the following may be mentioned:

$$\text{HO}-\text{CH}_2-\text{CH}_2-\text{CH}_2-\text{CONHCH}_2(\text{CH}_2)_8\text{CH}_3$$

(1) The reaction product of N-decylamine and γ-butyrolactone.

$$\underset{\text{OH}}{\text{CH}_3-\overset{|}{\text{C}}\text{H}-\text{CH}_2-\text{CH}_2\text{CONHCH}_2(\text{CH}_2)_8\text{CH}_3}$$

(2) The reaction product of N-decylamine and γ-valerolactone.

$$\text{HO}-\text{CH}_2-\text{CH}_2-\text{CH}_2\text{CONHCH}_2(\text{CH}_2)_{10}\text{CH}_3$$

(3) The reaction product of N-dodecylamine and γ-butyrolactone.

$$\text{HO}-\text{CH}_2-\text{CH}_2-\text{CH}_2\text{CONHCH}_2(\text{CH}_2)_{14}\text{CH}_3$$

(4) The reaction product of N-cetylamine and γ-butyrolactone.

$$\text{HO}-\text{CH}_2-\text{CH}_2-\text{CH}_2\text{CONHCH}_2(\text{CH}_2)_{16}\text{CH}_3$$

(5) The reaction product of octadecylamine and γ-butyrolactone.

(6) The reaction product of 1 mole (86.1 grams) of γ-butyrolactone with 1 mole (274 grams) of a commercially available mixture of amines having the following composition: hexadecylamine 10%, octadecylamine 10%, octadecenylamine 35%, octadecadienylamine 45%.

(7) The reaction product of 1 mole (86.1 grams) of γ-butyrolactone and 1 mole (365 grams) of a commercially available mixture of amines (derived from tall oil) and having the following composition: octadecenylamine 15%, octadecadienylamine 15%, abietylamine 70%.

(8) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.

(9) The reaction product of 1 mole (86.1 grams) of γ-butyrolactone and 1 mole (317 grams) of a commercially available primary amine made from a modified rosin (dehydroabietylamine) having the following formula:

(10) The reaction product of 1 mole (100.1 grams) of γ-valerolactone and 1 mole (365 grams) of a commercially available mixture of amines having the following composition: octadecenylamine 15%, octadecadienylamine 15%, abietylamine 70%.

(11) The reaction product of 0.2 mole (7.2 grams) γ-butyrolactone with 0.2 mole (58.9 grams) of the monoamide prepared from coconut oil and ethylenediamine in the usual manner.

(12) The reaction product of 1 mole (86.1 grams) γ-butyrolactone with 0.2 mole (65.3 grams) of stearamidoethyl amine.

(13) The reaction product of 0.5 mole (43 grams) γ-butyrolactone with 0.48 mole (320 grams) of polymerized fatty acid derived amine. The acid is available on the market under the brand name of Empol 1022 and is essentially a $C_{36}$ dibasic acid resulting from the polymerization of naturally occurring unsaturated $C_{18}$ fatty acids. The general properties of the polymerized acid (from which the amine is derived) are as follows:

| | | |
|---|---|---|
| Molecular weight | approx | 600 |
| Acid value, mg. KOH/g | min | 180 |
| Saponification value, mg. KOH/g | do | 185 |
| Neutralization equivalent | | 289–304 |
| Dimer content | percent | 75 |
| Trimer content | do | 22 |
| Monomer content | do | 3 |
| Sp. gr., 15.5° C | | 0.95 |
| Viscosity at 25° C | centistokes | 10,000 |

(14) The reaction product of 1 mole of γ-butyrolactone with 1 mole of a commercially available mixture of amines having the following composition: octylamine 8%, decyl amine 9%, dodecyl amine 47%, tetradecylamine 18%, hexadecyl amine 8%, octadecyl 5%, and octadecenyl 5%.

The thickening agents of the present invention as previously stated are employed in any petroleum hydrocarbon currently utilized in the preparation of various types of greases. The nature or character of the lubricating oil or mineral oil is immaterial so long as it has a viscosity of 50 to 5,000 at 100° F. (S.S.U.) (secs. Saybolt Universal). The greases are in the form of gels and when the N-substituted-γ-hydroxycarboxylic acid amides, when present in the proportion of 0.1% to 3% by weight of the petroleum hydrocarbon or mineral oil, form smooth semi-solid masses at room temperature. The amount of the thickening agent to be employed may range from 0.1 to as high as 10% based on the weight of the petroleum hydrocarbon and may vary somewhat depending upon the type of petroleum oil used. In most instances, an amount ranging between 0.1 to 2% is sufficient to impart gelling characteristics. The exact gelling mechanism has not yet been clearly established. It is believed, however, to be related to the hydrogen bonding character of the various N-alkyl-γ-hydroxycarboxylic acid amides.

In preparing the grease compositions of the present invention, the N-substituted-γ-hydroxycarboxylic acid amide is added to the petroleum hydrocarbon having the foregoing viscosity characteristics in the aforementioned amount, and the mixture heated to a temperature between 60 and 120° C. and the mixture then cooled to room temperature. As the temperature is lowered, a point is reached below which a stable thixotropic gel is obtained. Gels can also be prepared by mixing the petroleum hydrocarbon with the thickening agent and maintaining the system below the temperature at which the low viscosity solution obtains. In this case, the gelling agent with the passage of time gels the petroleum hydrocarbon. The gels and greases can also be obtained when the system, i.e., mixture is maintained at constant temperature and the gelling agent first dissolved and then gelled.

The greases or gels of the present invention have the advantage of being thixotropic stiff gels before working, and are rust inhibiting, thus protecting the metal on which they are used. They are water resistant, and hence do not tend to emulsify and wash away. In addition, they form films which greatly improve lubrication since such films are not subject to shearing forces as compared with ordinary greases and lubricants which operate upon their viscosity effects alone. The greases of the present invention reduce friction in the higher pressure system, and do not deposit any undesirable residues. They burn without forming ash.

In order to disclose the invention in greater detail, the following examples are furnished. It is to be clearly understood that these examples are merely illustrative only and are not intended to limit the scope of the invention claimed. All parts given are percent by weight.

*Example 1*

| | Percent |
|---|---|
| The product of illustration (1) | 2 |
| 150/100° F. (S.S.U.) (seconds Saybolt Universal), asphalt base red oil | 98 |

The product of illustration (1) and the oil were heated together to 110° C. to effect solution. The molten mass allowed to cool with slow agitation until it formed a smooth semi-solid mass. The mass was then allowed to cool to room temperature and agitated slowly until it became smooth, and of clear appearance. The penetration stability was determined according to the ASTMD 217–47T (Amer. Soc. for Testing Materials, Specification D-217-47). The resulting grease had a dropping point estimated at 78° C.

*Example 2*

Example 1 was repeated with the exception that the product of illustration (1) was replaced by products of illustrations (6), (7) and (8). The percent employed of the latter and the results obtained are as follows:

| Product of Illustration | Percent | Dropping Point Estimated, °C. |
|---|---|---|
| (6) | 2.0 | 80 |
| (7) | 0.5 | 65 |
| (7) | 2.0 | 65 |
| (8) | 0.5 | 70 |
| (8) | 2.0 | 80 |

*Example 3*

Seven lubricating oils and seven mineral oil samples containing the thickening agents were prepared on a percentage by weight basis. The gels were obtained by warming and then cooling the mixture. The gels were thoroughly agitated before the measurement of the viscosity was carried out. In every case the degree of gelation was much greater before agitation, and become greater after agitation if the system were not disturbed. The following table shows the viscosities at room temperature, 25° C., of various solutions of some of the illustrative products measured by means of a Brookfield synchrolectric viscosimeter.

| Gelling Agent | Viscosity (Centipoises) 2% of Gelling Agent in Lubricating Oil | Viscosity 2% of Gelling Agent in Light Mineral Oil |
|---|---|---|
| Compound of Illustration: | | |
| (1) | 900 | 750 |
| (3) | 970 | 735 |
| (5) | 1,200 | 800 |
| (6) | 2,350 | 1,200 |
| (7) | 970 | 800 |
| (8) | 1,300 | 150 |
| Blank (untreated oil-viscosity) | 540 | 15.5 |

In some lubricating grease compositions, the rust inhibiting properties are enhanced by heating one mole of an N-substituted-γ-hydroxycarboxylic acid amide with one mole of diethanol amine, triethanol amine, etc. for one hour at 150° C. with stirring and then allowing the mixture to cool at room temperature. The resulting product is readily compounded with various types of liquid petroleum hydrocarbon by merely mixing and heating to a temperature slightly under which the liquid petroleum hydrocarbon will thicken to oil. The mixture is thereafter stirred to insure homogeneity and allowed to cool. In general, the rust inhibiting properties of the oil compositions prepared in accordance with the present invention are so good that the addition product with diethanol amine, etc. is not necessary.

Example 4

The compound of illustration (6) was treated with diethanolamine to form an addition product and then compounded with kerosene at a concentration of 0.1%, warmed slightly and cooled. This composition was noted to exist as a pronounced gel.

Example 5

The compounds of illustration (8) were compounded with kerosene at a concentration of 0.1%, warmed slightly and then cooled. Subsequently, a pronounced gel was formed.

The thickening agents of the present invention are capable of producing various types of greases. The exact nature of the grease will be dictated by the application to which it is to be applied. The nature of the grease will also depend considerably on the hydrocarbon liquid which is gelled, the exact thickening agent used, the proportions of each constituent of the composition and the technique of the manufacture which involves the manner of incorporating the thickening agent, the degree of heating employed, the rate of cooling the composition after heating and the physical stress and shear to which the composition is subjected during and after the cooling operation.

Thus, greases of any desirable consistency may be produced, for example National Lubricating Grease Institute grades 1 through 6 by merely varying the composition. By way of illustration, an oil of 540 cps. at 25° C., initial boiling point of 375° C., containing about 5% of the product of illustration (14) will have an ASTM (D-217-52T) penetration of approximately 2%.

The compounds of the various illustrations when employed as thickening agents have, in certain cases, exhibited antioxidant properties. This is a very desirable property in a lubricant additive.

It is to be understood that the foregoing detailed description is given merely by way of illustration and that many variations may be made therein without departing from the spirit of this invention.

What is desired to be secured by Letters Patent is:

1. A grease composition comprising (a) a liquid petroleum hydrocarbon having a Saybolt viscosity at about 100° F. in the range of from about 50 to about 5,000, and (b) a thickening agent in an amount in the range of from about 0.1 to about 10 percent by weight of said petroleum hydrocarbon, said thickening agent consisting essentially of the reaction product of an alkanolamine and at least one N-substituted-γ-hydroxycarboxylic acid amide having the following general formula:

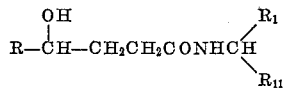

wherein R represents a member selected from the class consisting of hydrogen and methyl group, $R_1$ represents an organic radical containing from 10 to 30 carbon atoms, and $R_{11}$ represents a member selected from the class consisting of hydrogen and an alkyl group of from 1 to 18 carbon atoms, the total number of carbon atoms constituting the groups in both $R_1$ and $R_{11}$ being at least 10 and not more than 48 carbon atoms, said reaction product being formed by reacting equimolar amounts of said alkanolamine and said amide at about 150° C. for a period of about 1 hour.

2. A grease composition according to claim 1 in which the alkanolamine is diethanolamine.

3. A grease composition according to claim 1 in which the alkanolamine is triethanolamine.

4. A grease composition comprising (a) a liquid petroleum hydrocarbon having a Saybolt viscosity at about 100° F. in the range of from about 50 to about 5,000, and (b) a thickening agent in an amount in the range of from about 0.1 to about 10 percent by weight of said petroleum hydrocarbon, said thickening agent consisting essentially of the reaction product from the reaction of diethanolamine with the amide product formed from γ-butyrolactone and a mixture of amines consisting of 10% hexadecylamine, 10% of octadecylamine, 35% of octadecenylamine and 45% of octadecadienylamine, said reaction product being formed by reacting equimolar amounts of said diethanolamine and said amide product at about 150° C. for a period of about 1 hour.

References Cited in the file of this patent

UNITED STATES PATENTS

| | | |
|---|---|---|
| 2,898,301 | Mayhew et al. | Aug. 4, 1959 |
| 2,923,738 | Williams et al. | Feb. 2, 1960 |
| 2,958,665 | Stefcik et al. | Nov. 1, 1960 |